(No Model.)
W. L. ROBINSON.
UNDERGROUND CONDUIT FOR ELECTRIC WIRES.
No. 346,688. Patented Aug. 3, 1886.
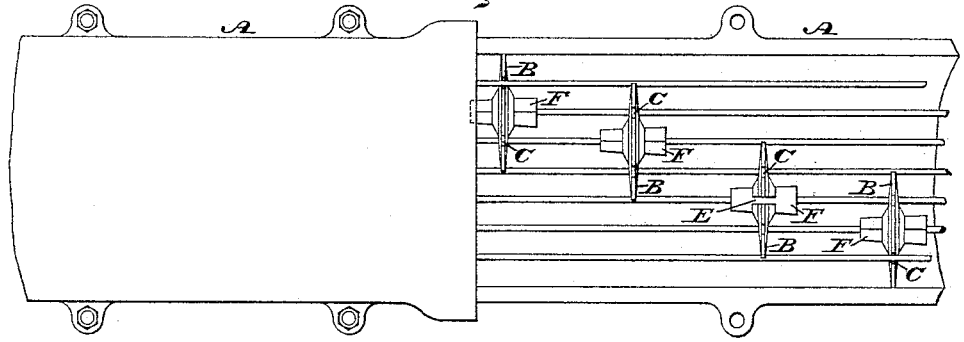
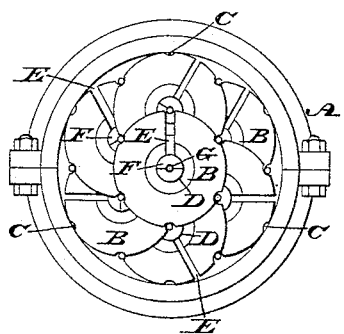
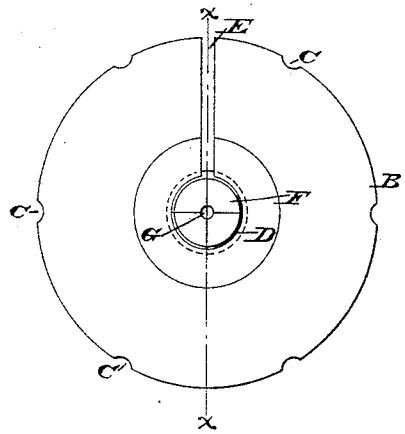
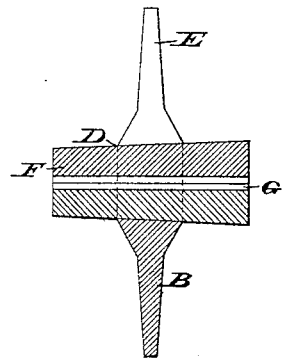
WITNESSES:
INVENTOR:

UNITED STATES PATENT OFFICE.

WILLIAM L. ROBINSON, OF PHILADELPHIA, PENNSYLVANIA.

UNDERGROUND CONDUIT FOR ELECTRIC WIRES.

SPECIFICATION forming part of Letters Patent No. 346,688, dated August 3, 1886.

Application filed February 20, 1886. Serial No. 192,637. (No model.)

*To all whom it may concern:*

Be it known that I, WILLIAM L. ROBINSON, a citizen of the United States, residing in the city and county of Philadelphia, State of Pennsylvania, have invented a new and useful Improvement in Underground Conduits for Electric Wires, which improvement is fully set forth in the following specification and accompanying drawings, in which—

Figure 1 represents a top or plan view of a portion of an underground conduit for electric wires embodying my invention. Fig. 2 represents an end view thereof. Fig. 3 represents a face view of a detached portion on an enlarged scale. Fig. 4 represents a section thereof in line *x x*, Fig. 3.

Similar letters of reference indicate corresponding parts in the several figures.

My invention relates to improvements in underground conduits for electric wires; and it consists in providing the same with means, substantially as hereinafter described, for sustaining the wire.

Referring to the drawings, A represents an underground conduit for electric wires, the same being of usual construction.

B represents a disk or block formed of insulating material, located within the conduit, and having a periphery with grooves C thereon, a central opening, D, and a slot, E, extending from the periphery to said opening. Fitted in the opening D is a plug, F, which is formed in sections, the inner faces whereof are grooved, as at G, said plug being tapering, so as to be wedged or tightened against the walls of the opening D. The wire is passed through the slot E and placed on the lower section of the plug F. The upper section of the plug is then located and the plug forced into the opening, whereby it is firmly held in position and the wire reliably sustained. Other wires may be placed around the periphery of the disk B in the grooves C, and a number of disks located in the conduit at suitable distances apart, whereby the wires may be sustained at intervals on the different disks employed and held properly separated from each other.

It will be seen that the wires may be run through a conduit and the disks located therein wherever desired, the wires that are to be sustained at the center of the disks being readily applied in position through the slots E, this being a feature of importance in employing the disks for wires that have been laid, it not being necessary to remove such wires to pass them through the central openings.

If desired, several grooves may be formed in the faces of the sections of the plug F, and a number of openings and plugs employed, each opening being in communication with a slot leading to the same from the circumference of the disk. Again, the lower section may be cast or formed with the disk, leaving the upper section free to be applied and removed, as desired.

I am aware that it is not new to construct a wire-support for an electric conduit of insulating-disks having a central recess and a slot; neither is it new to form the support of a disk with a grooved periphery; neither is it new to employ a cylindrical sectional plug having a grooved inner face, and such I do not claim.

Having thus described my invention, what I claim as new, and desire to secure by Letters Patent, is—

A wire-support having a central opening with a slot leading thereto from the periphery, and a wedge-shaped sectional plug with a grooved inner face, substantially as described.

W. L. ROBINSON.

Witnesses:
   JOHN A. WIEDERSHEIM,
   A. P. GRANT.